Oct. 12, 1965    S. G. HAYTER ETAL    3,211,402
MOUNTING FOR PANEL INSTRUMENTS
Filed Sept. 3, 1964

INVENTORS
Stanley G. Hayter
& Leo T. Hanley
BY John L. Stoughton
ATTORNEY

United States Patent Office 3,211,402
Patented Oct. 12, 1965

3,211,402
MOUNTING FOR PANEL INSTRUMENTS
Stanley G. Hayter, Bloomfield, and Leo T. Hanley, Maplewood, N.J., assignors to Westinghouse Electric Corporation, East Pittsburgh, Pa., a corporation of Pennsylvania
Filed Sept. 3, 1964, Ser. No. 394,163
6 Claims. (Cl. 248—27)

This invention relates generally to the mounting of instruments on instrument panels and more particularly to the mounting of such an instrument on the rear side of and aligned with an aperture through an instrument panel whereby the indicating portion of the instrument is viewable from the front side of the instrument panel.

An object of this invention is to provide an improved structure for mounting an instrument on an instrument panel.

Another object of this invention is to provide a means for securing an instrument mounting structure to the instrument panel independently of the instrument.

A still further object of this invention is to provide such a structure which will give a pleasing appearance from the front and which will hide any differences in dimension between the size of the instrument and the holes through the instrument panel.

A still further object of this invention is to provide a new and improved mounting which may be assembled entirely from the rear side of the panel.

Another object of this invention is to provide such a structure in which the instrument will not drop out of the panel should the mounting become somewhat loosened.

Other objects of this invention will be apparent from the description, the appended claims and the drawings, in which:

Figure 1:
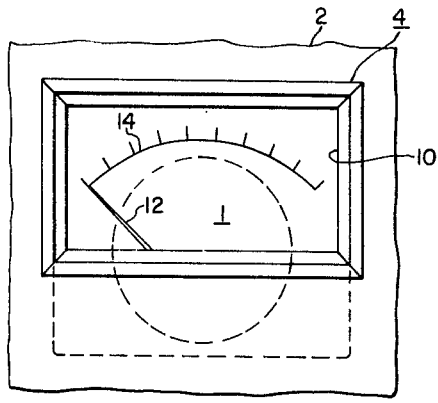
FIGURE 1 represents a front view of a portion of an instrument panel showing the instrument mounted thereon in accordance with the invention.

Referring to the drawings by characters of reference, the numeral 1 indicates generally an electrical instrument of any desired character which is to be mounted entirely on the rear side of an instrument panel 2 and held thereon by means of an instrument supporting structure comprising a frame 4 held by a pair of spring clips 6 to the panel 2 and straps 7 holding the instrument to the frame 4. The instrument 1, which may be rectangular in cross section, as shown in FIG. 2, has a front wall 8 having a transparent portion covering the instrument pointer 12 and indicia 14 whereby they are viewable through the opening 10 formed by the frame 4.

Figure 2:
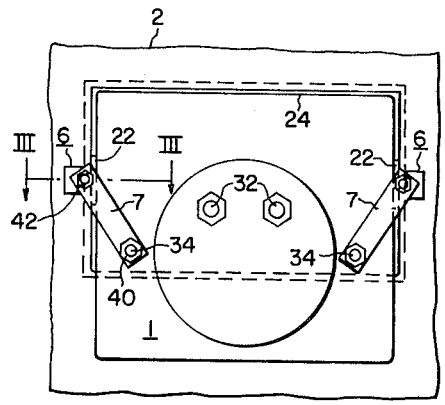
FIG. 2 is a view similar to FIG. 1, but looking from the rear side of the mounting panel.
Figure 3:
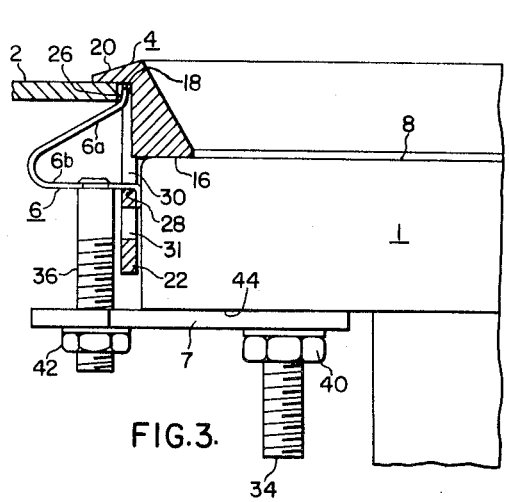
FIG. 3 is an enlarged partial view taken substantially along the line III—III of FIG. 2 and looking in the direction of the arrows.
Figure 4:
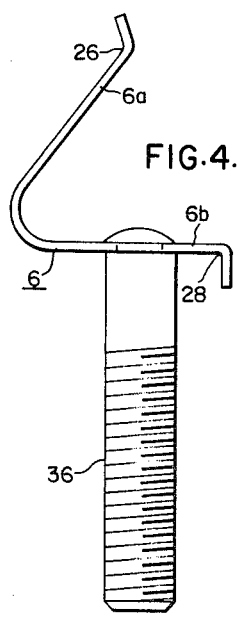
FIG. 4 is an enlarged view showing the spring clip and the stud attached thereto.
Figures 5, 6:
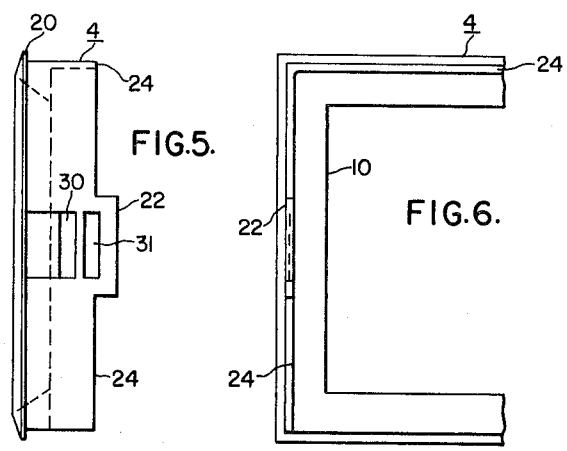
FIG. 5 is an end view of the frame.
FIG. 6 is a partial rear view of the same frame.

As may be seen in FIG. 3, the front wall 8 of the instrument is somewhat larger in area than the opening 10 whereby the instrument seats against the rearwardly facing surface 16 of the frame 4 and is located by a U-shaped meter locating flange 24 which extends along each of two opposite side edges and across the top edge of the frame 4, as is best shown in FIGS. 2 and 6. The frame 4, which projects through the panel-board aperture 18 has a peripheral outwardly extending flange or lip 20 which seats against the front surface of the panelboard 2 and thereby frames the viewed portion of the instrument 1.

The frame 4 is held within the aperture 18 by the pair of spring clips 6 which are located between a pair of rearwardly extending tabs 22 and the peripheral edge of the aperture 18 on the rear wall of the panel 2. These tabs 22 may be part of the U-shaped meter-locating flange 24. Each of the spring clips 6 comprises an arm 6a and an arm 6b which are integrally formed by bending a single piece of spring material. The arms 6a and 6b extend at an acute angle with respect to each other and when the arms are in holding position they are stressed. The arms 6a and 6b terminate in outwardly facing abutments 26 and 28 which, as is clearly indicated in FIG. 3, seat against the rearward peripheral portion of the aperture 18 of the panelboard and a seating surface of the tab 22 provided by an aperture 30 or 31, depending upon the thickness of the panel 2, and resiliently hold the frame 4 in the panel 2.

The instrument 1 is of a construction usually found in the instrument art and includes the usual input terminals 32 and the usual pair of mounting studs 34. The straps 7 are apertured at each end and connect the adjacent stud to an adjacent threaded stud 36 carried by the arm 6b of the adjacent clip 6. As illustrated in FIG. 3, the stud 36 extends outwardly from the arm 6b in a direction rearwardly of the panelboard 2. Nuts 40 and 42 are threaded respectively upon the studs 34 and 36. The nut 40 clamps the strap 7 against the rear wall 44 of the instrument 1 and the nut 42 holds the strap 7 with respect to the frame 4 whereby the front wall 8 of the instrument 1 is securely held against the rearwardly facing surface 16 of the frame 4. It will further be appreciated that this also results in the holding of the abutment 28 in tight engagement with the frame 4.

The frame 4 and thereafter the instrument 1 may be mounted on the panel 2 from the rear or wiring side. The frame 4 may be inserted through the panel aperture 18 then rotated and positioned with the peripheral lip 20 in engagement with the front wall of the panelboard 2. Thereafter the spring clips 6 may be inserted. The threaded stud 36 forms a convenient operator for this assemblying operation. With the frame 4 held to the panelboard 20 by the clips 6, the instrument 1 may be positioned with its front wall 8 engaging the rearwardly facing surface 16 with the straps 7 receiving the studs 36. If the straps 7 have not already been provisionally attached to the studs 34, they are installed. The tightened nuts 40–42 hold the instrument in place as illustrated. With this construction, a loosening of the nuts 40 and 42 will not result in the instrument falling out of the frame 4 for the reasons obvious from an inspection of FIG. 2.

Although the invention has been described with reference to a single embodiment thereof, numerous modifications are possible and it is desired to cover all modifications falling within the spirit and scope of the invention.

What is claimed and is desired to be secured by United States Letters Patent is as follows:

1. An apparatus for supporting an instrument on one side of an instrument panel in overlying relationship with respect to an aperture in the panel whereby the instrument may be viewed from the opposite side of the panel, said apparatus comprising a frame member of a desired shape and cross sectional area to define an opening through which the instrument may be viewed, said member having a peripheral lip extending outwardly from said member, said lip having surfaces adapted to seat against the opposite side of the panel at the periphery of the panel aperture, said member having a pair of spaced tabs extending rearwardly from said frame member in a direction generally normal to said surfaces and defining a space adapted to receive the instrument, each said tab being provided with an aperture spaced rearwardly of said lip surfaces, a pair of spring clips, each said clip member having first and second legs resiliently secured together at a common end portion and extending at an angle with respect to each other with their free end portions resiliently urged in relatively outwardly direction, each said leg being provided with a mounting surface adjacent its said free end portion, a first of said clips having said mounting surface of a first of its said legs extending into said aperture of a first of said tabs and having said mounting surface of the second of its said legs located adjacent a first portion of said frame member which is adjacent the intersection of said first tab and said frame member, said mounting surface of said second leg of said first clip being located on said first clip such that when it is in engagement with a portion of one side of the panel adjacent the panel aperture it will be spaced from said lip surface, a second of said clips having said mounting surface of a first of its said legs extending into said aperture of the second of said tabs and having said mounting surface of the second of its said legs located adjacent a second portion of said frame member, said mounting surface of said second leg of said second clip being located on said second clip such that when it is engaged with a portion of said one side of the panel adjacent the panel aperture it will be spaced from said lip surface, each said clip being provided with a post member, said post member having a first end portion carried by said first leg of the respective said clip and a second portion spaced from the said first leg of the respective said clip with which it is associated, each said post member being provided with securing means at its said second portion for holding an instrument against said frame member in said frame member space.

2. In combination, an instrument having an end wall, a panel having first and second sides and an aperture therethrough of lesser area than the area of said end wall, a frame defining a viewing opening and having a main portion located within said aperture and a peripheral lip engaging one side of said panel around the periphery of said aperture, said frame having first and second tabs extending outwardly thereof in a direction away from the other side of said panel, each said tab being provided with an abutment, first and second spring clips, each said clip having first and second legs resiliently urged in a direction tending to separate outward end portions thereof, each said outward end portion being provided with an outwardly facing abutment, said first clip being positioned on the said other side of said panel adjacent said first tab with said abutment of its said first leg in engagement with said abutment of said first tab and with said abutment of its said second leg in engagement with said panel, said second clip being positioned on the said other side of said panel adjacent said second tab with said abutment of its said first leg in engagement with said abutment of said second tab and with said abutment of its said second leg in engagement with said panel, the resilience of said clips urging said frame against said one side of said panel, and means supporting said instrument on said other side of said panel with a portion registering with said viewing opening.

3. The combination of claim 2 in which each said first leg is provided with a post extending outwardly therefrom in a direction outwardly of said other side of said panel, said instrument is located in abutting engagement with said frame and said instrument supporting means comprises abutment members individually carried by said posts and engaging said instrument whereby said abutment of said first legs are held in engagement with the respective said abutments of said tabs and said instrument is held in engagement with said frame.

4. The combination of claim 3 in which each said second leg is provided with a locating portion adjacent its said abutment, each said locating portion being positioned within said panel aperture exteriorly of said frame and holding its said adjacent abutment in engagement with a portion of said panel adjacent said panel aperture.

5. In combination, an instrument having an end wall, at least a portion of said end wall being transparent whereby an indicating means of said instrument may be observed externally of said instrument, an instrument panel having front and rear sides and an aperture therethrough, a frame located in said aperture and having a peripheral lip seating against said front side of said panel and overlying the peripheral of said aperture, said frame having a seating surface facing outwardly from said rear side of said panel and defining a viewing aperture, said frame having first and second tabs located at spaced positions about said seating surface and extending outwardly therefrom and rearwardly of said rear side of said panel, each said tab being provided with a shoulder facing said rear wall of said panel, first and second spring clips each said clip having spaced legs extending at an acute angle relative to each other and resiliently urged in a parting direction, each said leg being provided with an outwardly bent end portion to provide an outward facing shoulder, said first clip being located adjacent said first tab with said shoulder of its said first leg in engagement with said shoulder of said first tab and with said shoulder of its said second leg in engagement with a first peripheral portion of said panel aperture, said second clip being located adjacent said second tab with said shoulder of its said first leg in engagement with said shoulder of said second tab and said shoulder of its said second leg in engagement with a second pehipheral portion of said panel aperture, said clips resiliently urging said frame lip against said front side of said panel, each said first leg being provided with a rearwardly extending stud, said instrument being positioned with its end wall in engagement with said seating surface of said frame with at least a portion of said transparent aligned with said viewing aperture of said frame, said instrument having first and second mounting studs, and supporting strap means extending between said studs of said instrument and said studs of said clips and holding said shoulders of said first legs against said shoulders of said tabs and said instrument against said seating surface of said frame.

6. Apparatus for supporting an instrument comprising: an instrument panel having a front and a rear side and an instrument viewing aperture, a frame defining a viewing opening, said frame being located within said aperture and having means for seating against said front side of said panel adjacent the periphery of said aperture, said frame having at least one tab extending outwardly from said frame and beyond said rear side of said panel, a generally U-shaped spring having first and second outwardly extending arms, each said arm terminating in an offset portion providing a lip and a shoulder formed at the intersection of said shoulder with the remainder of its arm, said lip of said first arm extending within said aperture externally of said frame and terminating in spaced relation with said flange when said shoulder of said first arm is in engagement with said panel, said tab having an aperture, said second arm extending through said tab aperture with said lip engaging the side of said tab which faces the said viewing opening, a supporting post carried by said second arm and extending outwardly therefrom in a direction away from said panel, an instrument seating against said frame and primarily located on said rear side of said panel, said instrument having a mounting post, a strap having apertures individually receiving said posts for supporting said instrument, and means clamping said strap to said instrument post and to said supporting post.

References Cited by the Examiner
UNITED STATES PATENTS

| | | | |
|---|---|---|---|
| 2,055,990 | 9/36 | Stickney | 248—27 |
| 2,494,669 | 1/50 | Nodine | 248—27 |
| 2,824,714 | 2/58 | Silvey | 248—27 |
| 2,886,201 | 5/59 | Dickey | 220—3.6 |
| 2,978,135 | 4/61 | Furnish | 220—3.6 |

CLAUDE A. LE ROY, *Primary Examiner.*